3,663,480
CATALYTIC COMPOSITION FOR THE PREPARA-
TION OF HIGH VINYL POLYBUTADIENE
Robert P. Zelinski and Richard J. Sonnenfeld, Bartles-
ville, Okla., assignors to Phillips Petroleum Company
No Drawing. Filed Mar. 9, 1970, Ser. No. 17,936
Int. Cl. C08d 1/14
U.S. Cl. 252—431                                9 Claims

ABSTRACT OF THE DISCLOSURE

A catalyst system is disclosed which is used to prepare high vinyl polybutadiene by the polymerization of 1,3-butadiene to obtain a product having at least 75 percent 1,2-addition. The catalyst system consists of a molybdenum compound and an aluminum compound wherein the molybdenum compound is represented by the general formula $MoX_aY_b$ and the aluminum compound is represented by the general formula $R_cAlY_d$. In the above formulas X is a halogen, Y is selected from the formulas OR and $O_2CR$ wherein R is a hydrocarbyl radical containing 1 to 30 carbon atoms, and the sum of $a$ and $b$ is 5, the sum of $c$ and $d$ is 3, $a$ and $b$ are integers having a value of 1 to 4, and $c$ and $d$ are integers having a value of 1 to 2.

FIELD OF THE INVENTION

This invention relates to catalyst systems. This invention further relates to catalyst systems consisting of molybdenum compounds and aluminum compounds. This invention specifically relates to combination catalyst systems of molybdenum and aluminum compounds useful in the preparation of 1,2-polybutadiene by the polymerization of 1,3-butadiene.

BACKGROUND OF THE INVENTION

Catalyst systems containing molybdenum are known in the art for polymerizing butadiene. It is also known that combination catalyst systems composed of molybdenum pentachloride and trihydrocarbylaluminum compounds give low yields of resinous insoluble polymer. Addition of a compound such as an ether, amine or amide to the above mentioned molybdenum pentachloride and trihydrocarbylaluminum compounds is necessary in order to produce rubbery polybutadiene having a high vinyl configuration, that is, one having a high percentage of 1,2-addition.

THE INVENTION

It is thus an object of this invention to provide a novel catalyst composition useful for the preparation of 1,2-polybutadiene by the polymerization of 1,3-butadiene.

Other aspects, objects, and the several advantages of this invention will be apparent to one skilled in the art from consideration of the following disclosure, examples and claims.

We have now discovered a novel catalyst system comprising a molybdenum-halogen-ligand compound and a hydrocarbylaluminum oxyorgano compound which when used for the polymerization of 1,3-butadiene produces a rubbery 1,2-polybutadiene having at least 75 percent and less than 95 percent vinyl configuration. The 1,2-polybutadiene is produced in good monomer conversion percentage, and in a readily processable molecular weight range without addition of adjuvants or modifiers. The composition of the catalyst system consists of the combination of the hydrocarbylaluminum oxyorgano compound, hereafter known as the aluminum compound, and the molybdenum-halogen-ligand compound, hereafter known as the molybdenum compound, in the molar ratio range of aluminum compound to molybdenum compound of 0.9 to 1 to 10 to 1, preferably in the range from 1.25 to 1 to 5 to 1, and still more preferably in the range from 1.3 to 1 to 3 to 1.

The quantity of catalyst employed is expressed in terms of the molar quantity of molybdenum compound added per 100 grams of 1,3-butadiene. For example, the amount of catalyst used is expressed as being in the range of 0.1 to 100, preferably 0.5 to 10, and still more preferably 0.7 to 5, gram millimoles molybdenum compound per 100 grams of 1,3-butadiene. Utilizing this relationship of molybdenum compound to 1,3-butadiene in combination with the above-mentioned molar ratio relationship between the aluminum compound and the molybdenum compound enables the determination of the quantity of aluminum compound to be added in view of the 1,3-butadiene employed.

The molybdenum compound has the general formula $MoX_aY_b$, wherein X is a halogen and Y is a ligand having the general formulas OR and

wherein R is a hydrocarbyl radical such as alkyl, cycloalkyl, aryl, or a combination thereof containing 1 to 30 carbon atoms. The sum of the integers, $a$ and $b$, is 5; $a$ has a value in the range of 1 to 4 and $b$ has a value in the range of 1 to 4.

Examples of the molybdenum compound useful herein include molybdenum trichloride diacetate; molybdenum chloride tetraacetate; molybdenum tetrachloride acetate; molybdenum trichloride dioctanoate; molybdenum trichloride di(untricosanoate); molybdenum tribromide distearate; molybdenum diiodide trihexanoate; molybdenum bromide tetra(dodecanoate); molybdenum tetrafluoride benzoate; molybdenum trichloride dibenzoate; molybdenum tribromide di(cyclohexancarboxylate); molybdenum trichloride diethoxide; molybdenum chloride tetramethoxide; molybdenum dibromide triphenoxide; molybdenum triiodide di(tricosanoxide); molybdenum tetrafluoride cyclohexanoxide; molybdenum trichloride dioctanoxide; and the like.

The preferred molybdenum compounds are the molybdenum trihalide carboxylates of which molybdenum trichloride dioctanoate $[MoCl_3(CH_3(CH_2)_6CO_2)_2]$ is the most preferred.

The aluminum compound has the general formula $R_cAlY_d$ wherein R and Y have the same definitions as given for the molybdenum compound. The sum of the integers $c$ and $d$ is 3; $c$ has a value of 1 to 2 and $d$ has a value of 1 to 2.

Examples of the aluminum compound useful herein include ethoxydiethylaluminum; diethoxyethylaluminum; phenoxydimethylaluminum; tricosanoxydi-n-butylaluminum; cyclohexanoxydi-n-tricosanylaluminum; diphenoxyethylaluminum; methoxy-di-n-propylaluminum; methylaluminum diacetate; diphenylaluminum hexanoate; di-n-butylaluminum tricosanoate; diisobutylaluminum cyclohexanecarboxylate; ethylaluminum diacetate; diethylaluminum benzoat; n-butylaluminum dibenzoate; and the like.

The preferred aluminum compounds are the alkoxy dialkylaluminum compounds of which ethoxydiethylaluminum $[CH_3CH_2)_2AlOCH_2CH_3]$ is the most preferred.

The polymerization of 1,3-butadiene with the catalyst composition of this invention is preferably conducted in the presence of an inert hydrocarbon diluent, but the presence of a diluent is not required. Inert hydrocarbon diluents which are useful herein include aliphatic, cycloaliphatic, and aromatic hydrocarbons containing 4 to 12 carbon atoms per molecule. Examples of diluents include butane, dodecane, hexane, cyclohexane, benzene, toluene, and the like. The quantity of diluent usually employed herein is sufficient to dissolve the catalyst and monomer present which, when expressed as a weight ratio of solvent to butadiene, is in the range of less than 1 to 1 to 10 to 1 and preferably 8 to 1.

The polymerization can be conducted over a wide range of temperature, pressure, time and charge order conditions. However, certain conditions are preferred which are as follows:

The reaction temperature can vary from about 0° to 200° C., with the preferred temperature being in the range of 10° to 100° C. The reaction pressure employed should be sufficient to maintain the reaction mixture substantially in liquid phase. This pressure can be either autogeneous or applied. The reaction time is a function of temperature, catalyst level, and catalyst ratio, however, the reaction time is ordinarily in the range of 1 minute to 24 hours or more. The reactor charge order can also vary, however, it is preferred that the following order be employed: solvent first, followed by inert gas purge, monomer, aluminum compound, and molybdenum compound. The inert gas purge (which is usually nitrogen) is not critical to the process, however, it does serve to remove contaminants such as water and air, which could interfere with the reaction.

The rubbery polybutadienes produced according to this invention, which have at least 75 and less than 95 percent 1,2 addition, can be compounded and vulcanized in a manner similar to that used in the prior art for compounding natural and synthetic rubber. Vulcanization accelerators, vulcanizing agents, reinforcing agents, and fillers such as have been used in natural rubber can likewise be used when compounding the polybutadienes produced according to this invention. The instant polymers have a low heat buildup and a high reistance to oxidation and blowout. These characteristics make them useful in applications where natural an dsynthetic rubbers are now used, and particularly useful for heavy duty applications. The polymers can be blended with other polymers such as cis-polybutadiene, and they can be used in the manufacture of automobile tires and other rubber articles such as gaskets, tubing, covering for wire cable, rubber heels, rubber tires and the like.

The following examples demonstrate the preparation of rubbery high vinyl polybutadiene using as catalyst in Examples II and III the molybdenum and aluminum compounds of this invention.

EXAMPLE Ia

The molybdenum compound used herein for purposes of demonstrating the catalyst of this invention was molybdenum trichloride dioctanoate. This molybdenum compound was prepared as follows: 82 grams (0.30 mole) of commercially available molybdenum pentachloride was refluxed with 86.6 grams (0.6 mole) of commercially available n-octanoic acid in 1000 milliliters of polymerization grade cyclohexane for a period of 1 hour. A nitrogen sweep was employed to remove displaced hydrogen chloride from the reaction. After the 1 hour refluxing period, the reaction mixture was filtered through an inline filter of medium porosity. The filtrate, being the desired molybdenum compound dissolved in cyclohexane, was found by analysis to contain 0.22 mole of molybdenum trichloride dioctanoate per liter of cyclohexane. This 0.22 molar molybdenum compound solution was used in subsequent experiments.

EXAMPLE Ib

The aluminum compound used herein for purposes of demonstrating the catalyst of this invention was ethoxydiethylaluminum. The aluminum compound was prepared as follows: Equal volume proportions of 0.30 molar triethylaluminum in cyclohexane and 0.30 molar absolute ethanol in cyclohexane were combined. These components reacted to produce 0.15 molar ethoxydiethylaluminum. This 0.15 molar aluminum compound solution was used in subsequent experimentation.

EXAMPLE II

Butadiene was polymerized with the catalyst of this invention employing the recipe shown below:

| | |
|---|---|
| 1,3-butadiene, parts by weight | 100 |
| Toluene, parts by weight | 800 |
| Ethoxydiethylaluminum, millimoles | Variable |
| Molybdenum trichloride dioctanoate, millimoles | Variable |
| Temperature, ° C. | 70 |
| Time, hours | 5 |

In these runs, toluene was charged to the reactor first followed by a nitrogen purge. Butadiene was then added followed by the aluminum compound and then the molybdenum compound. Temperature was then adjusted to the desired level for the polymerization reaction. At the end of the polymerization period each reaction was terminated with a 10 weight percent solution of 2,2'-methylene-bis(4-methyl-6-tert-butylphenol) in a 50/50 by volume mixture of isopropyl alcohol and toluene. The amount added was sufficient to provide 1 part by weight per 100 parts by weight of butadiene charged. Each terminated polymerization mixture was stirred with isopropyl alcohol to coagulate the polymer. The coagulated polymer from each run was separated and dried at 60° C. under vacuum.

The inherent viscosity, Mooney viscosity, and the percent trans and vinyl configuration reported in Table 1, below, as well as in connection with all succeeding examples were determined as follows:

Inherent viscosity was determined according to the procedure of U.S. 3,278,508, column 20, notes a and b.

Mooney viscosity (ML-4 at 212° F.) was deetermined according to the procedure of ASTM D1646-63.

The percent trans and vinyl configuration was determined according to the procedure of U.S. 3,336,280, column 5, line 63 through column 6, line 8.

The results of the experimental runs conducted in Example II are set out in Table 1, below:

TABLE 1

| Run numbers | Compound, mmoles | | Mole ratio, Al/Mo | Conversion, percent | Inherent viscosity | Mooney viscosity, ML-4 | Configuration, percent | |
|---|---|---|---|---|---|---|---|---|
| | Al | Mo | | | | | Trans | Vinyl |
| 1 | 2.0 | 1.5 | 1.33 | 84 | 3.31 | 97 | 5.5 | 89 |
| 2 | 3.0 | 2.2 | 1.36 | 90 | 2.88 | 79 | 6.2 | 90 |
| 3 | 6.0 | 4.4 | 1.36 | 91 | 2.58 | 53 | 7.6 | 84 |
| 4 | 4.0 | 2.9 | 1.38 | 88 | 2.50 | 70 | 7.5 | 85 |
| 5 | 1.5 | 0.72 | 2.08 | 75 | 4.20 | 79 | 4.7 | 90 |
| 6 | 6.0 | 2.2 | 2.73 | 58 | 2.98 | | 5.1 | 90 |
| 7 | 5.0 | 1.5 | 3.33 | 50 | 3.20 | | 4.6 | 86 |
| 8 | 2.5 | 0.72 | 3.47 | 53 | 4.37 | | 4.5 | 90 |
| 9 | 8.0 | 1.5 | 5.35 | 32 | 2.82 | | 4.4 | 84 |
| 10 | 12.0 | 2.2 | 5.45 | 26 | 2.29 | | 5.2 | 86 |
| 11 | 4.5 | 0.72 | 6.25 | 34 | 3.98 | | 5.1 | 86 |

Example II illustrates the polymerization of 1,3-butadiene to polybutadiene having 84 to 90% vinyl configuration utilizing the catalyst composition of this invention. Monomer conversions range from 26 to 91% of theoretical yield depending upon, to the greater extent, the mole ratio of aluminum compound to molybdenum compound and, to the lesser extent, the catalyst level.

Particular attention is invited to runs 1 through 5 inclusive which feature monomer conversions of 75 percent and greater for aluminum to molybdenum mole ratios of about 1.3 to 1 to 2.1 to 1 over a wide range of catalyst level.

EXAMPLE III

Butadiene was polymerized according to a recipe similar to that employed in Example II except that other aluminum compounds within the scope of the invention were tested as a catalyst component in place of the ethoxydiethylaluminum used in all the runs of Example II.

Polymerization recipe

| | |
|---|---|
| 1,3-butadiene, parts by weight | 100 |
| Toluene, parts by weight | 800 |
| Molybdenum trichloride dioctanoate, millimoles | 2.2 |
| Aluminum compound, millimoles | Variable |

Run #1, diethylaluminum octanoate.
Run #2, diethoxyethylaluminum.

The temperature, time, charge order, and procedure employed were exactly the same as those described for Example II.

The results of these runs are shown in Table 2 below:

TABLE 2

| Run number | Al Compound, mmoles | Mole ratio, Al/Mo | Conversion, percent | Viscosity Inherent | Viscosity Mooney, ML-4 | Configuration, percent Trans | Configuration, percent Vinyl |
|---|---|---|---|---|---|---|---|
| 1 | 3.75 | 1.7 | 73 | 2.49 | 71 | 5 | 92 |
| 2 | 4.5 | 2.0 | 70 | 3.63 | 94 | 5.9 | 84 |

Example III illustrates the use of the catalyst system of this invention utilizing the molybdenum compound of Example II, and two different aluminum compounds. The two aluminum compounds serve to illustrate the variety of useful components within the scope of this invention. Several runs utilizing each of the aluminum compounds were made. The conversions reported in Table 2 where the highest obtained from the runs made for the particular aluminum compound. Said runs did include aluminum to molybdenum molar ratios both greater than and less than the ratio reported with which the highest conversion was obtained.

EXAMPLE IV

For purposes of comparison, butadiene was polymerized according to a recipe similar to that employed in Example II except that at least one of the two catalyst components employed in each run was not within the scope of the invention.

Polymerization recipe

| | |
|---|---|
| 1,3-butadiene, parts by weight | 100 |
| Toluene, parts by weight | 800 |
| Molybdenum compound, millimoles | Variable |

Runs #1 and 2, molybdenum trichloride dioctanoate.
Run #3, molybdenum pentachloride.

Organometal compound, millimoles _____ Variable
Run #1, triethylaluminum.
Run #2, diethyl zinc.
Run #3, ethoxydiethylaluminum.

The temperature, time, charge order, and procedure employed were exactly the same as those described for Example II.

The results of these runs are shown in Table 3 below:

TABLE 3

| Run number | Compound, mmoles Organometal | Compound, mmoles Mo | Mole ratio organometal/Mo | Conversion, percent | Inherent viscosity | Configuration, percent Trans | Configuration, percent Vinyl |
|---|---|---|---|---|---|---|---|
| 1 | 2.4 | 2.2 | 1.09 | 53 | 3.51 | 5.5 | 87 |
| 2 | 3.0 | 2.2 | 1.36 | 12 | 3.66 | 6 | 82 |
| 3 | 2.1 | 3.0 | 0.7 | 58 | 3.77 | 5.8 | 86 |

Example IV illustrates the use of a polymerization catalyst system for producing 1,2-polybutadiene from 1,3-butadiene utilizing a procedure similar to that of Example II except that in each run one of the catalyst components was within the scope of this invention and one of the components was not within the scope of this invention. Several runs utilizing each of the catalyst compositions of runs 1, 2, and 3 were made. The conversions reported in Table 3 were the highest obtained from the runs made for the particular composition. Said runs did employ organometal/Mo molar ratios both greater than and less than the ratio reported with which the highest conversion was obtained. While the percent vinyl configuration for these runs compares favorably with those of Examples II and III, the polymer conversion were low.

It will be noted that run 3 utilized molybdenum pentachloride, a prior art catalyst component, and ethoxydiethylaluminum, a catalyst component of this invention. Considering that the conversion shown in run 3 was the highest obtained for the molybdenum pentachloride-ethoxydiethylaluminum system, these results compared with those in Examples II and III demonstrate the greater efficiency of the catalyst composition of this invention.

EXAMPLE V

An evaluation sample of polybutadiene was prepared according to this invention. The recipe employed is shown below:

Polymerization recipe

| | |
|---|---|
| 1,3-butadiene parts by weight | 100 |
| Toluene, parts by weight | 800 |
| Ethoxydiethylaluminum, millimoles | 6.0 |
| Molybdenum trichloride dioctanoate, millimoles | 4.4 |
| Temperature, ° C. | 70 |
| Time, hours | 5 |

The charging procedure and polymer isolation procedures of Example II were also employed in this run. The results of this run are shown below.

| | |
|---|---|
| Conversion, percent | 88 |
| Inherent viscosity (I.V.) | 2.18 |
| Mooney viscosity (ML-4) | 50 |
| Unsaturation: | |
| Percent trans | 8 |
| Percent vinyl | 83 |

Compounding recipe

| | Parts by weight |
|---|---|
| Polybutadiene (as prepared above) | 100 |
| IRB #2 blend [a] | 50 |
| Philrich 5 [b] | 10 |
| Zinc oxide | 3 |
| Stearic acid | 2 |
| Flexamine G [c] | 1 |
| Sulfur | 1.75 |
| NOBS Special [d] | 1.0 |

[a] Industry Reference Black—A high abrasion furnace type carbon black.
[b] Highly aromatic oil, ASTM Type 101, ASTM D2226–63T.
[c] A physical mixture containing 65% of a complex diarylamine-ketone reaction product and 35% of N,N-diphenyl-p-phenylenediamine.
[d] N-oxydiethylene-2-benzothiazolesulfenamide.

The stock was mixed in a BR-Banbury mixer and the processing data shown below were obtained.

| | |
|---|---|
| Dump temperature, °F. | 315 |
| Mixing time, minutes | 4 |
| Dispersion, cured (0–10 best) | 7 |
| Green tensile, p.s.i. | 65 |
| Extrusion at 250° F., Garvey [a]: | |
| G./inch | 2.00 |
| Inches/minute | 54 |
| Gram/minute | 108 |
| Rating (12 best) | 12 |

[a] Ind. Eng. Chem., 34, 1309 (1942).

Physical properties are shown below for stocks cured for 45 minutes at 307° F.

| | |
|---|---|
| 300% modulus, p.s.i.[a] | 1475 |
| Tensile, p.s.i.[a] | 2140 |
| Elongation, percent [a] | 385 |
| ΔT, ° F.[b] | 60.1 |
| Resilience, percent [c] | 57.3 |
| Shore A Hardness [d] | 63 |
| Time to blowout, minutes [e] | 58.0 |
| ΔT, ° F. at blowout [e] | 98 |

[a] ASTM D1646–62T.
[b] ASTM D623–62.
[c] ASTM D945–59.
[d] ASTM D1706–61.
[e] Goodrich Flexometer, 257 lb./sq. inch load, 0.250–inch stroke, 200° F. oven temperature.

The above results demonstrate that the high-vinyl polybutadiene produced according to this invention possesses good properties when compounded in a tread stock recipe. In particular, the heat buildup is low and resilience is good, and the time to blowout is long for said polymer stock.

Reasonable variations and modifications, which will be apparent to those skilled in the art, can be made in this invention without departing from the spirit or scope thereof.

That which is claimed is:

1. A novel catalyst system for the polymerization of 1,3-butadiene consisting of a molybdenum compound represented by the general formula $MoX_aY_b$ and an aluminum compound represented by the general formula $R_cAlY_d$ wherein X is a halogen, Y in said aluminum compound and in said molybdenum compound is a ligand selected from the group consisting of OR and

R in said ligand and in said aluminum compound is a hydrocarbyl radical containing 1 to 30 carbon atoms, the sum of $a$ and $b$ is 5, $a$ is an integer having a value of 1 to 4, $b$ is an integer having a value of 1 to 4, the sum of $c$ and $d$ is 3, $c$ is an integer having a value of 1 to 2, $d$ is an integer having a value of 1 to 2, and further wherein the molar ratio of said aluminum compound to said molybdenum compound is in the range of 0.9 to 1 to 10 to 1.

2. The catalyst system of claim 1 wherein in said general formula for said molybdenum compound $a$ is 3, $b$ is 2, and Y is representative of the formula

3. The catalyst system of claim 1 wherein in said general formula for said aluminum compound $c$ is 2, $d$ is 1, and Y is representative of the formula OR.

4. The catalyst system of claim 1 wherein in said general formula for said aluminum compound $c$ is 1, $d$ is 2, and Y is representative of the formula OR.

5. The catalyst system of claim 1 wherein said aluminum compound is ethoxydiethylaluminum, said molybdenum compound is molybdenum trichloride dioctanoate, and said ratio of said aluminum compound to said molybdenum compound is in the range of 1.25:1 to 5:1.

6. The catalyst system of claim 2 wherein said molybdenum compound is molybdenum trichloride dioctanoate.

7. The catalyst system of claim 3 wherein said aluminum compound is ethoxydiethylaluminum.

8. The catalyst system of claim 4 wherein said aluminum compound is diethoxyethylaluminum.

9. The catalyst system of claim 1 wherein said aluminum compound is diethylaluminum octanoate.

References Cited

UNITED STATES PATENTS

| 3,451,987 | 6/1969 | Dawans et al. | 252—429 A X |
| 2,940,964 | 6/1960 | Mostardini et al. | 252—429 A X |
| 3,095,406 | 6/1963 | Short et al. | 252—431 C X |

PATRICK P. GARVIN, Primary Examiner

U.S. Cl. X.R.

252—431 R; 260—94.3